United States Patent
Kato (10) Patent No.: US 9,689,689 B2
(45) Date of Patent: Jun. 27, 2017

(54) NAVIGATION DEVICE AND PROGRAM FOR PERFORMING ROUTE GUIDANCE ALONG A ROUTE USING, AS A RECOGNIZED ROAD, AN EXTENSION ROAD NOT ACTUALLY TRAVELED WHICH EXTENDS STRAIGHT FROM AND IS CONTINUOUS WITH A ROAD ACTUALLY TRAVELED

(71) Applicant: DENSO CORPORATION, Kariya, Aichi-pref. (JP)

(72) Inventor: Noriko Kato, Toyoake (JP)

(73) Assignee: DENSO CORPORATION, Kariya (JP)

( * ) Notice: Subject to any disclaimer, the term of this patent is extended or adjusted under 35 U.S.C. 154(b) by 10 days.

(21) Appl. No.: 14/408,057

(22) PCT Filed: Jun. 6, 2013

(86) PCT No.: PCT/JP2013/003550
§ 371 (c)(1),
(2) Date: Dec. 15, 2014

(87) PCT Pub. No.: WO2014/002393
PCT Pub. Date: Jan. 3, 2014

(65) Prior Publication Data
US 2015/0177008 A1    Jun. 25, 2015

(30) Foreign Application Priority Data
Jun. 29, 2012 (JP) .................................. 2012-147003

(51) Int. Cl.
*G01C 21/34* (2006.01)

(52) U.S. Cl.
CPC .......... *G01C 21/34* (2013.01); *G01C 21/3484* (2013.01)

(58) Field of Classification Search
None
See application file for complete search history.

(56) References Cited

U.S. PATENT DOCUMENTS

2012/0310526 A1* 12/2012 Mizuno .............. G01C 21/3617
701/424

FOREIGN PATENT DOCUMENTS

| JP | H10-089996 A | 4/1998 |
| JP | 2003-296884 A | 10/2003 |

(Continued)

OTHER PUBLICATIONS

International Search Report and Written Opinion of the International Search Authority mailed Sep. 10, 2013 in the corresponding PCT application No. PCT/JP2013/003550 (with English translation).

(Continued)

*Primary Examiner* — Adam Tissot
(74) *Attorney, Agent, or Firm* — Posz Law Group, PLC (57) ABSTRACT

A navigation device is provided, which includes a retrieval section that retrieves a route to a destination, and a storage device that stores a traveled road as a recognized road and stores an extension road as a recognized road. The traveled road is a road actually traveled by a vehicle. The extension road is a road continuous with the traveled road. The retrieval section includes a selection section. When multiple routes each to the destination are retrieved, the selection section selects a route from among the multiple routes based on a distance of an unrecognized road, a travel time taken to travel the unrecognized road, or a connection condition of the unrecognized road. The unrecognized road is a road other than the recognized road stored in the storage device.

20 Claims, 9 Drawing Sheets

(56) References Cited

FOREIGN PATENT DOCUMENTS

| | | | |
|---|---|---|---|
| JP | 2004-286545 A | 10/2004 | |
| JP | 2006-024194 A | 1/2006 | |
| JP | 2011-038943 A | 2/2011 | |
| JP | 2011-124385 A1 * | 6/2011 | ......... G01C 21/3617 |
| JP | 2012-078368 A | 4/2012 | |
| WO | 2007/102406 A1 | 9/2007 | |
| WO | 2014/002489 A1 | 1/2014 | |

OTHER PUBLICATIONS

Office Action issued Jan. 5, 2016 in the corresponding JP application No. 2012-147003 (with English translation).

* cited by examiner

| LINK ID | TRAVEL HISTORY INFO |
|---|---|
| L1 | 1: WITH RECORD |
| L2 | 1: WITH RECORD |
| L3 | 1: WITH RECORD |
| ... | ... |
| Lm | 2: EXTENSION ROAD |
| ... | ... |
| Ln | 0: WITHOUT RECORD |

NAVIGATION DEVICE AND PROGRAM FOR PERFORMING ROUTE GUIDANCE ALONG A ROUTE USING, AS A RECOGNIZED ROAD, AN EXTENSION ROAD NOT ACTUALLY TRAVELED WHICH EXTENDS STRAIGHT FROM AND IS CONTINUOUS WITH A ROAD ACTUALLY TRAVELED

CROSS REFERENCE TO RELATED APPLICATIONS

The present disclosure is a U.S. national stage application of PCT/JP2013/003550 filed on Jun. 6, 2013, and is based on Japanese Patent Application No. 2012-147003 filed on Jun. 29, 2012, the contents of which are incorporated herein by reference.

TECHNICAL FIELD

The present disclosure relates to a navigation device for retrieving a route to a set destination and performing route guidance along the route.

BACKGROUND ART

The navigation device retrieving a route and performing route guidance along the route is in widespread use. Such a navigation device searches for a route with minimum cost from a present position being a starting point to a destination being an end point.

Cost is various. The cost includes not only a travel distance and a travel time but also a task process such as a right turn and a left turn, which increase a driving workload. That is, a technology for selecting an optimum route includes a view concerning how to reduce driver's workload.

In view of this, there is proposed a navigation device that sets a route to the same route once traveled before (see Patent Literature 1 for example). This device stores a locus data to a destination and sets a return route from the destination based on the locus data.

PRIOR ART LITERATURES

Patent Literature

[Patent Literature 1] JP H10-89996

SUMMARY OF INVENTION

In the technology described in Patent Literature 1, although the workload of a driver can be reduced in the return route from the destination, there is no measure against travel to a destination for the first time. As a result, this is insufficient from a viewpoint of reducing the workload of a driver.

The present disclosure is made in view of the foregoing. It an object of the present disclosure to provide a navigation device that performs route retrieval capable of minimizing driver's workload in traveling along a route to a destination.

According to an example of the present disclosure, a navigation device performs route guidance along a route and comprises a retrieval section that retrieves a route to a set destination. A storage device of the navigation device stores a traveled road as a recognized road and stores an extension road as a recognized road. The traveled road is a road actually traveled by a vehicle. The extension road is a road continuous with the traveled road. The recognized road is a road recognized by a user with a high possibility.

In particular, the retrieval section includes a selection section. When the retrieval section retrieves a plurality of routes each to the set destination, the selection section selects a route from among the plurality of routes based on a distance of an unrecognized road, a travel time taken to travel the unrecognized road, or a connection condition of the unrecognized road. The unrecognized road is a road other than the recognized road.

Typically, when the unrecognized road in total roads of the route increases, the driver's workload increases. Thus, when the plurality of routes each to the set destination are retrieved, the selection section selects a route from among the plurality of routes based on a distance of an unrecognized road, a travel time taken to travel the unrecognized road, or a connection condition of the unrecognized road. For example, the route with minimum distance of the unrecognized road may be selected from the routes.

This can minimize driver's workload in traveling along a route to a destination.

BRIEF DESCRIPTION OF DRAWINGS

The foregoing and other objects, features, and advantages of the present disclosure will become more apparent from the below detailed description made with reference to the accompanying drawings. In the drawings.

EMBODIMENTS FOR CARRYING OUT INVENTION

First Embodiment

Embodiments of the present disclosure will be described with reference to the accompanying drawings.

Figure 1:
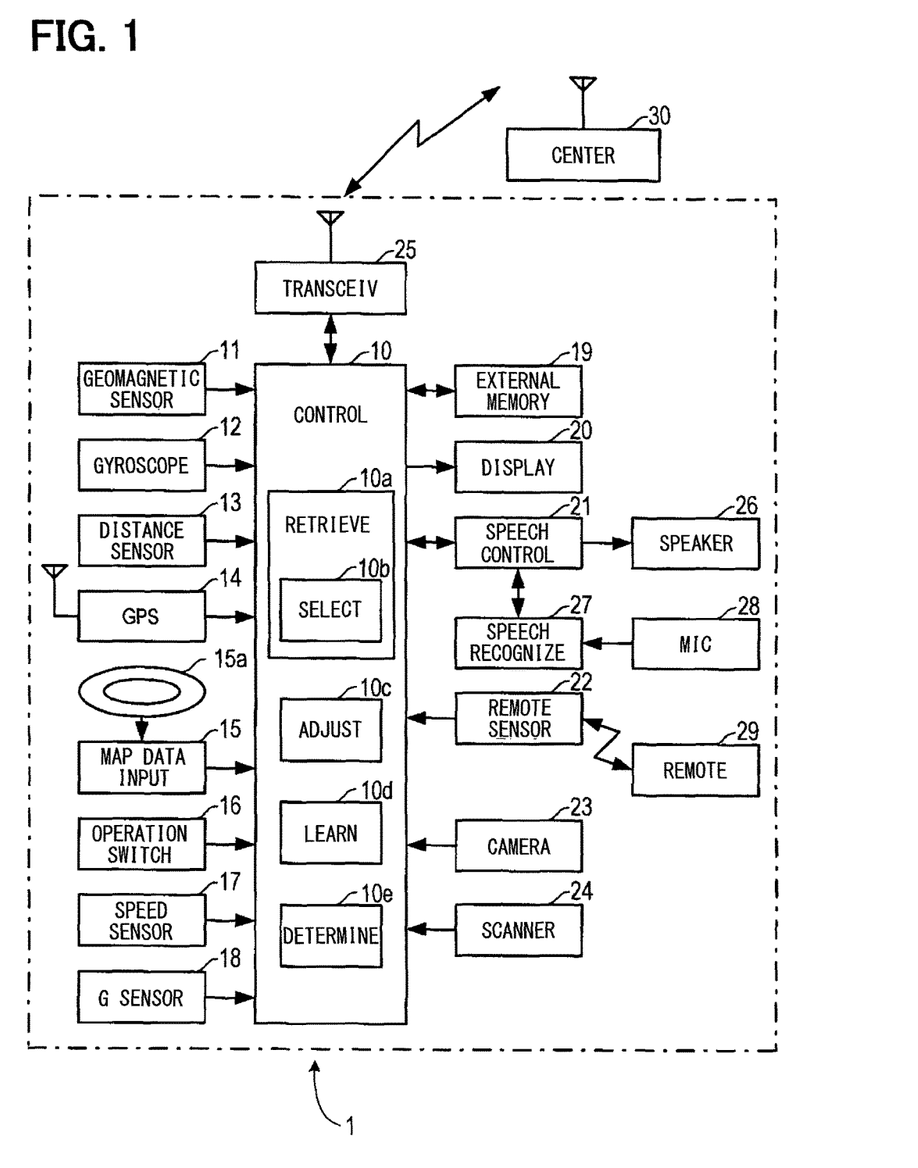
FIG. 1 is a block diagram illustrating a schematic configuration of a navigation device.

A navigation device 1 illustrated in FIG. 1 is mounted on a vehicle and includes a controller 10 as its major component. The controller 10 is configured as a computer system including a CPU, a ROM, a RAM, an I/O, and a bus line connecting these components. The controller 10 can perform a variety of processes. For example, according to programs, the controller 10 performs all or a part of: a travel history storing process, an extension road setting process; and a route retrieval process. The programs may be pre-installed in the navigation device 1 or may be provided through an electric telecommunication line. Moreover, the program be provided by being stored in a non-transitory tangible storage medium.

The controller 10 is connected with a geomagnetism sensor 11, a gyroscope 12, a distance sensor 13, a GPS receiver 14, a map data input device 15, an operation switch group 16, a speed sensor 17, a G sensor 18, external memory 19 (an example of storage device), a display device 20, an speech controller 21, a remote control sensor 22, a camera 23, and a scanner 24.

The geomagnetism sensor 11 detects the vehicle orientation based on geomagnetism. The gyroscope 12 outputs a detection signal corresponding to an angular velocity of the vehicle in rotary movement. The distance sensor 13 outputs the vehicle travel distance. The GPS receiver 14 receives a signal transmitted from artificial satellites for GPS (global positioning system) and detects the vehicle's position coordinates and altitude. Because of the above configuration, the controller 10 can calculate the vehicle's present position, orientation, and speed. A point positioning technique or a relative positioning technique may be used to calculate the present position based on an output signal from the GPS receiver 14.

The map data input device 15 inputs map data to the controller 10. The map data is stored in DVD-ROM 15a and is input to the controller 10 via the map data input device 15. Not only the DVD-ROM 15a but also an HDD or CD-ROM can be used. The map data includes road data, drawing data, map matching data, and route guidance data.

The operation switch group 16 is for a user to input various instructions and is embodied as a physical push button switch or the like. The operation switch group 16 may be embodied as a touch panel integrated with a display device 20.

The speed sensor 17 detects a vehicle speed. The G sensor 18 detects the vehicle acceleration. The external memory 19 is embodied as an HDD, for example. In the present embodiment, the external memory 19 stores a travel history.

The display device 20 displays a map and a variety of information. Specifically, the display device 20 uses a liquid crystal display device. The display device 20 displays map images, guidance routes, the present vehicle position, and other guidance information.

The speech controller 21 controls speech and is connected with a speaker 26 to generate the guidance speech. The speech controller 21 and the display device 20 provide the user with information. The speech controller 21 is also connected with a speech recognition device 27 and receives a speech signal that is input through a microphone 28 and is recognized by the speech recognition device 27. This enables the user to input various instructions by speeches.

The remote control sensor 22 receives a signal from a remote control terminal (remote) 29 and transmits the signal to the controller 10. This enables the user to remotely input various instructions.

The camera 23 includes a CCD camera and acquires video around the vehicle. The scanner 24 scans around the vehicle. A transceiver 25 performs data communication with an external center 30.

As described above, the external memory 19 stores the travel history. The travel history storing process will be described based on the flowchart in FIG. 2. This process is repeatedly performed while the vehicle is traveling.

At S100, the present vehicle position is acquired. This process acquires the present vehicle position using the geomagnetism sensor 11, the gyroscope 12, the distance sensor 13, and the GPS receiver 14, as illustrated in FIG. 1 for example.

Figure 2:
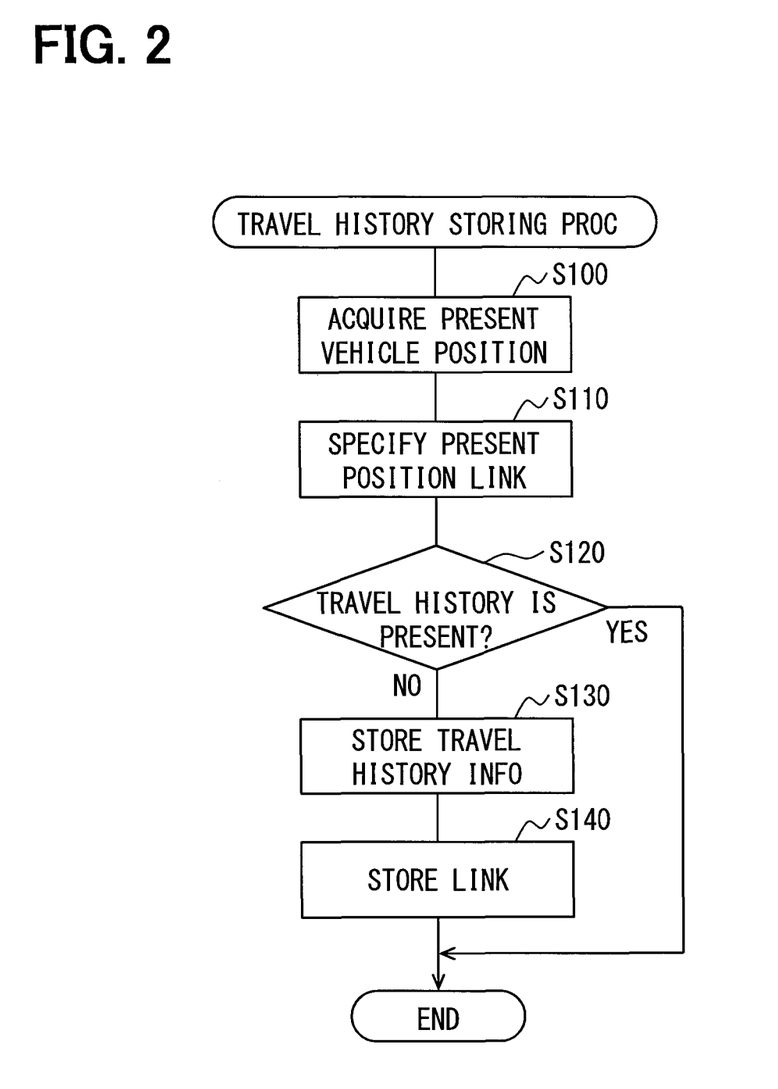
FIG. 2 is a flowchart illustrating a travel history storing process.

At S110, a link corresponding to the present position is specified. This process specifies a link ID corresponding to the present position acquired at S100. When "acquiring a link or specifying a link" is recited, it may refer to acquiring or specifying a link using a link ID. The same applies to the following description.

At S120, it is determined whether the travel history is present. Specifically, this process is based on the travel history information stored in the external memory 19. When a link is once traveled, the travel history information "1: record is present" is stored for this link. When the travel history information "1: record is present" is stored, the determination results in affirmative. When it is determined the travel history is present (YES at S120), the travel history storing process is ended without executing subsequent steps. When the travel record is determined as absent (NO at S120), the process proceeds to S130.

At S130, the travel history information is stored. This process stores "1: record is present" as the travel history information corresponding to the link acquired at S110.

At S140, the link is stored. This process stores a newly traveled link, which is the link corresponding to the travel history information newly stored at S130 as "1: record is present".

Figure 3:
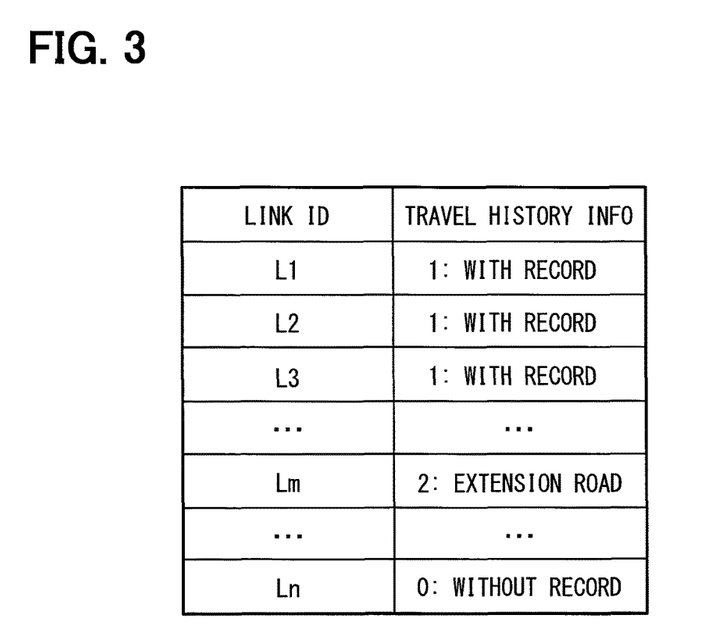
FIG. 3 is a diagram illustrating travel history information.

In the travel history storing process, the travel history information as illustrated in FIG. 3 is stored in association with links. The travel history information about links L1, L2, and L3, which are links once actually traveled, are stored as "1: record is present". The travel history information about a link Ln, which is a link not traveled yet, is stored as "0: record is absent". A link Lm related to the link having "1: record is present" is set to "2: extension road".

The extension road setting process will be described according to the flowchart in FIG. 4. The extension road setting process is performed when an ignition (IG) switch turns on. It is apparent that this does not limit the timing of performing the extension road setting process.

At S200, a link is acquired. This process acquires one link from among links stored at S140 in FIG. 2.

At S210, a link connected to a link end point is acquired. This process acquires one link connected to the end point of the link acquired at S200.

At S220, it is determined whether the guidance is needed at a connection point. This process determines whether the guidance is needed at a connection point between a reference link and the link acquired at S210. Generally, no guidance is needed when two links form a path that allows straight travel without a turn. However, there may be an irregular intersection (referred to also as a complicated intersection), which has many branches and is provided with special guidance data. In this case, it is determined that the guidance is needed even when the path allows straight travel without a turn. When it is determined that the guidance is needed (YES at S220), the process proceeds to S270. When it is determined that the guidance is not needed (NO at S220), the process proceeds to S230.

At S230, a road name is acquired. This process acquires a road name of the link acquired at S200 and a road name of the link acquired at S210.

At S240, it is determined whether the road names match. With regard to roads in the United States, for example, it may be determined whether both road types, such as interstate or state road or country road, and road numbers such as "1" and "10", match. When it is determined that the road names match (YES at S240), an extension road is set at S250. At S260, a link connected to the link end point of this extension road is acquired. Thereafter, the process is repeated from S220. In S250, the travel history information "2: extension road" is stored as the travel history information corresponding to the link. When it is determined that the road names do not match (NO at S240), the process proceeds to S270. It is noted that when the road name is absent, the road names are considered as matching.

At S270, it is determined whether another connection link is present. This process determines whether another links connected to the link acquired at S200 is present. When it is determined that another connection link is present (YES at S270), the process is repeated from S210. Because of this, other links connected to the link acquired at S200 is acquired. When it is determined that another connection link is absent (NO at S270), the process proceeds to S280.

At S280, it is determined whether an unprocessed link is present. This process determines whether an unprocessed link is present among the links stored at S140 in FIG. 2. When it is determined that an unprocessed link is present (YES at S280), the process is repeated from S200. When it is determined that an unprocessed link is absent (NO at S280), the extension road setting process is ended.

Specific illustration of the extension road setting process will be given.

Figure 5A:
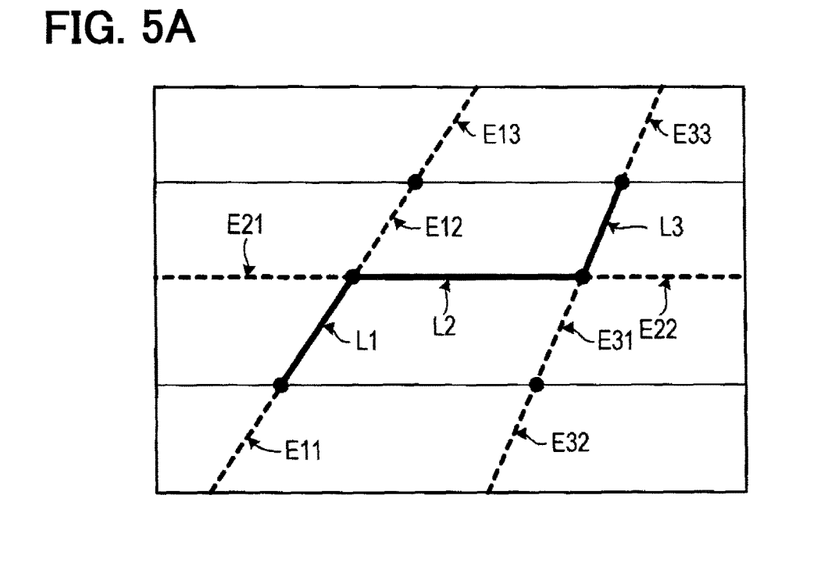
FIG. 5A is a diagram illustrating a specific example of the extension road setting process.

In FIG. 5A, links L1, L2, and L3 are links actually traveled before and are illustrated in solid line. The travel history information "1: record is present" is stored in association with the links L1, L2, and L3 (S130 in FIG. 2). The links L1, L2, L3 are stored as newly-traveled links (S140).

Figure 4:
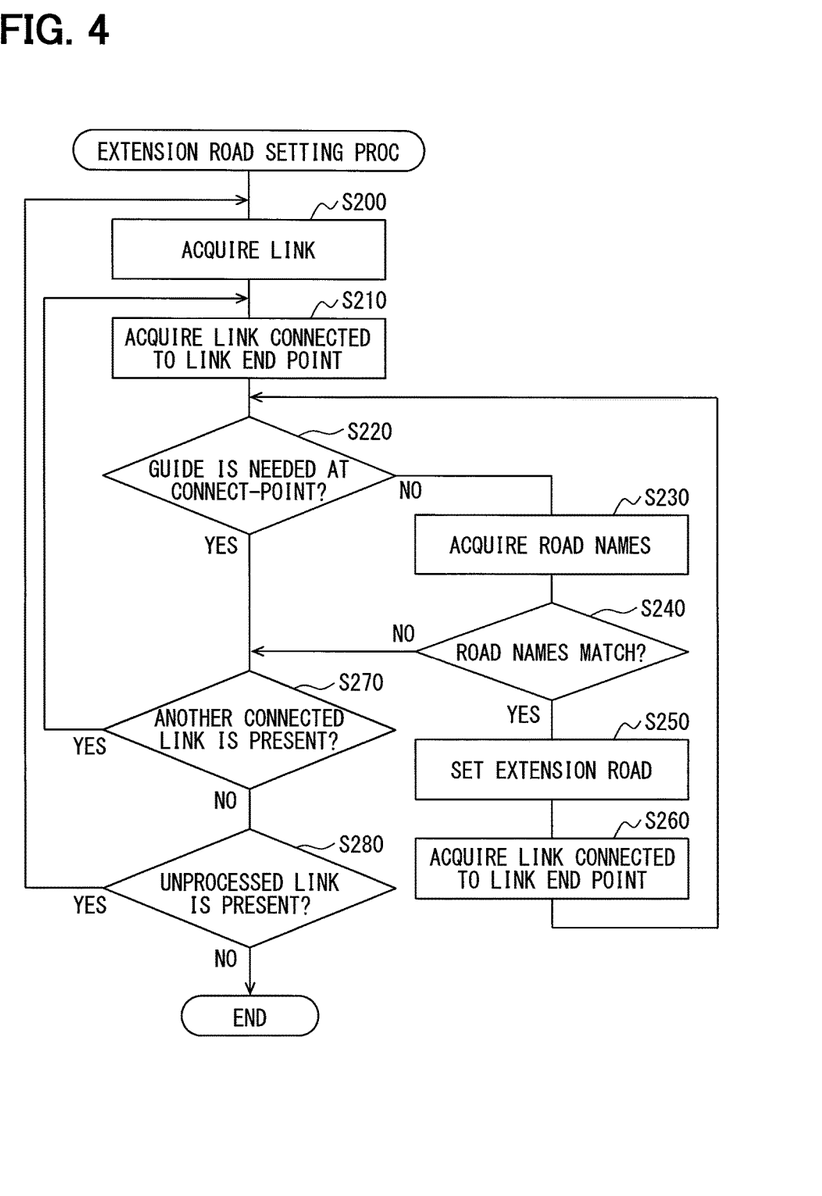
FIG. 4 is a flowchart illustrating an extension road setting process.

In the extension road setting process, it is determined whether the guidance is needed at a connection point (S220 in FIG. 4). When it is determined that the guidance is not needed (NO at S220), the roads names are acquired (S230) in the case of, for example, a straight path without a turn. When the road names match (YES at S240), the extension road is set (S250). Then, the similar processing is performed on a link connected to the extension road (S260). Therefore, as shown by dashed lines in FIG. 5A, the extension roads E11, E12, E13, . . . are set, provided that together with the link L1, they form a straight path without requiring a turn and that their road name matches the road name of the link L1. Additionally, the extension roads E21, E22 . . . are set, provided that together with the link L2, they form a straight path without requiring a turn and that their road name matches the road name of the link L2. Additionally, the extension roads E31, E32, E33 . . . are set, provided that together with the link L3, they form a straight path without requiring a turn and that their road name matches the road name of the link L3.

Figure 5B:
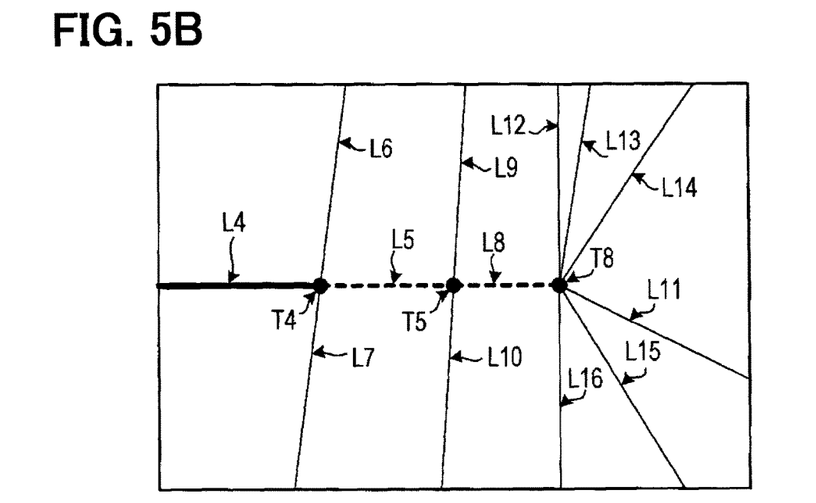
FIG. 5B is a diagram illustrating another specific example of the extension road setting process.

Specifically, as illustrated in FIG. 5B, a link L4 having the travel record is acquired (S200 in FIG. 4). Any one of the links connected to the link end point T4 is acquired (S210). When any one of the links L6 and L7 is acquired, it is determined that the guidance is needed (YES at S220) because a straight path without a turn is not formed. In this case, another link is newly acquired. When the link L5 is acquired, it is determined that the guidance is not needed (NO at S220) because a straight path without a turn is formed. In this case, the road name of the link L5 is acquired (S230). When its matches the road name of the link L4 (YES at S240), the link L5 is set as the extension road (S250), as shown by the dashed line. In this case, any one of links L8, L9, and L10 connected to the end point T5 of the link L5 set as the extension road is acquired (S260). The similar processes are performed on this link.

When link L8 is set as an extension road, any one of links L11, L12, L13, L14, L15, and L16 connected to the end point T8 of the link L8 is acquired (S260). When it is determined that the guidance is needed for any of links L11 through L16 (YES at S220) or when it is determined that although the guidance is not needed, the road names do not match (NO at S240), setting of an extension road based on the link L4 is ended.

Even when a path is straight without requiring a turn, it may be determined the guidance is needed. This is because in some cases, the path may contain a complicated intersection and a guidance data dedicated to the intersection is present. For example, as shown in FIG. 5B, even when the link L11 and the link L8 are connected to form a straight path, there are many links (L11 to L16) connected to the end point T8. In this case, the guidance data dedicated to the end point T8 may be prepared to take measures against a possibility of an uncertain decision on a straight travel along the road.

In the above way, the travel history is stored. It is noted that "traveled road" is a road actually traveled before and has "1: record is present", and that "extension road" is a road extending from the travel road and has "2: extend road". In the following, "traveled road" and "extension road", are collectively defined as "recognized road". Roads other than the recognized road are defined as unrecognized roads, which are roads that are highly likely unrecognized by a user.

The present embodiment has features in route retrieval by the navigation device 1. Next, route-retrieval processing is explained based on the flow chart of FIG. 6. This route-retrieval processing is performed when the destination is set.

Figure 6:
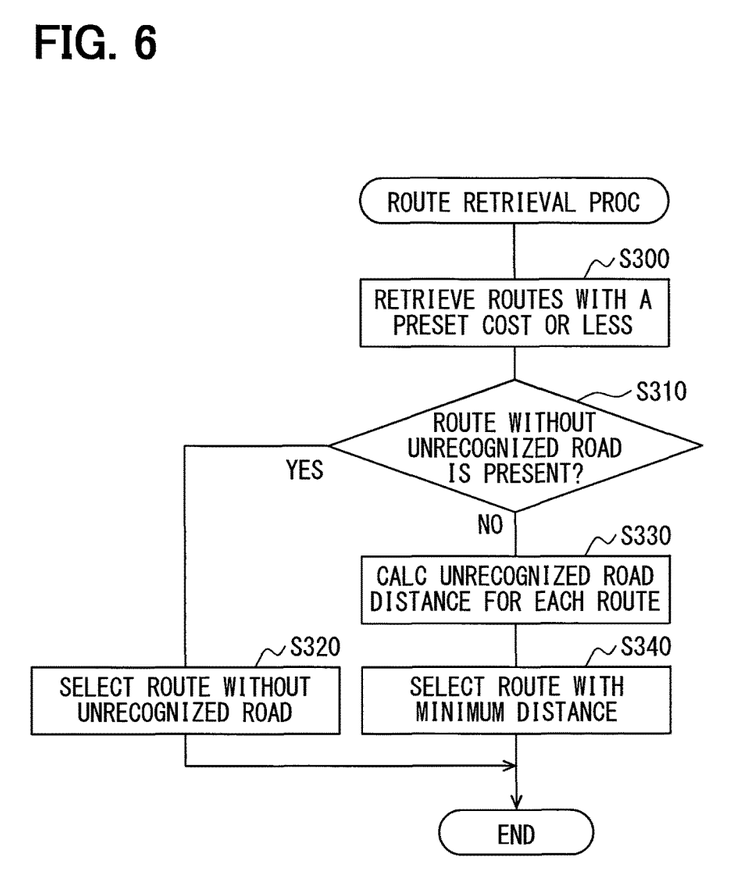
FIG. 6 is a flowchart illustrating a route retrieval process of a first embodiment.

At S300, multiple routes with a route cost from a present position (departure point) to a destination less than or equal to a predetermined cost are retrieved. The cost is set to a distance of links constituting the route, speed limit, the number of lanes, the number of branches at an intersection etc. A reason for retrieving the routes less than or equal to the predetermined cost includes excluding quite long way routes in advance.

At S310, it is determined whether or not a route without having an unrecognized road is available. The route without having an unrecognized road refers to a route consisting of recognized roads. When it is determined that a route without having an unrecognized road is available (YES at S310), the route without having an unrecognized road is selected at S320, that is, the route consisting of recognized roads is selected. Then, the route retrieval process is ended. When it is determined that a route without having an unrecognized road is not available (NO at S310), the process proceeds to S330.

At S330, a distance of the unrecognized road is calculated for each route. In this step, the distance of the unrecognized road in each route as a whole is calculated. At S340, the route having minimum distance is selected from among those calculated at S330.

Figure 7:
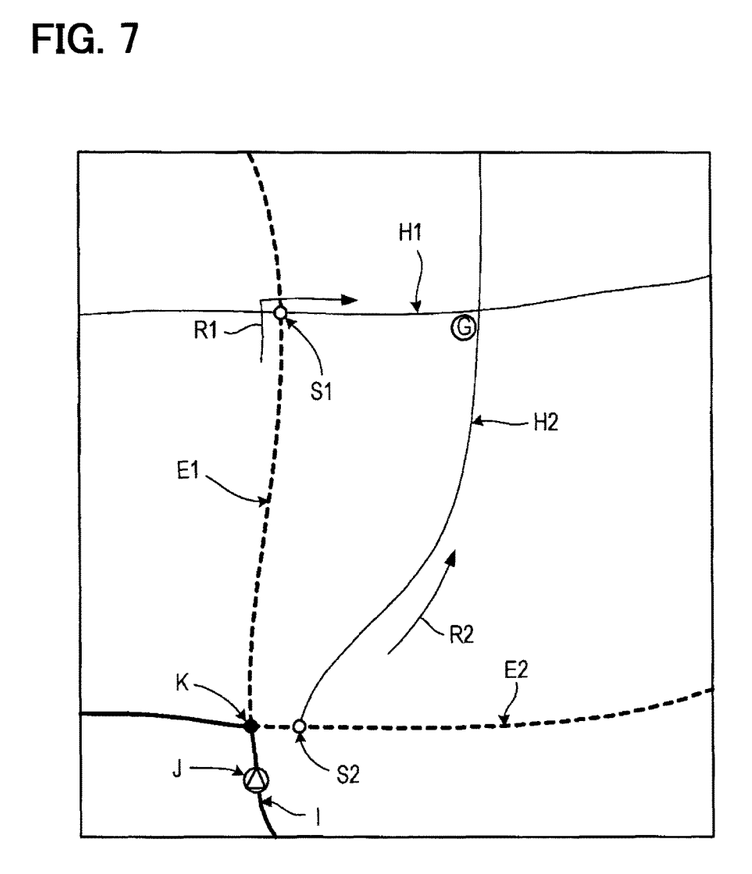
FIG. 7 is a flowchart specifically illustrating a route retrieval process.

For example, as shown FIG. 7, suppose that a vehicle J traveling on a road I retrieves a route to a destination G. In the above, the traveling road I is illustrated in solid thick line, the extension roads E1, E2 are illustrated in dashed line, and the unrecognized roads H1, H2 are illustrated in solid thin line.

In this case, a search for a route with a route cost from the present position (departure point) to the destination less than or equal to a predetermined cost is made (S300 in FIG. 6). Now, it is assumed that two routes R1, R2 are retrieved. One route R1 leads to the destination G via an intersection K and an intersection S1. The other route R2 leads to the destination G via the intersection K and an intersection S2.

In the route R1, a road from the intersection K to the intersection S1 is part of the extension road E1, and a road from the intersection S1 to the destination G is part of the unrecognized road H1. In the route R2, a road from the intersection K to the intersection S2 is part of the extension road E2, and a road from the intersection S2 to the destination G is part of the unrecognized road H2.

Therefore, it is determined that a route without having an unrecognized road is not available (NO at S310 in FIG. 6), and the distances of the unrecognized roads of the two routes R1, R2 are calculated (S330). Then, the route R1, which has a smaller distance of the unrecognized road, is selected (S340).

It is conceivable that when one goes to a place he or her has never been to, a route to the destination via a recognized road (presently traveled road and extension road) and an unrecognized road is set.

Figure 8:
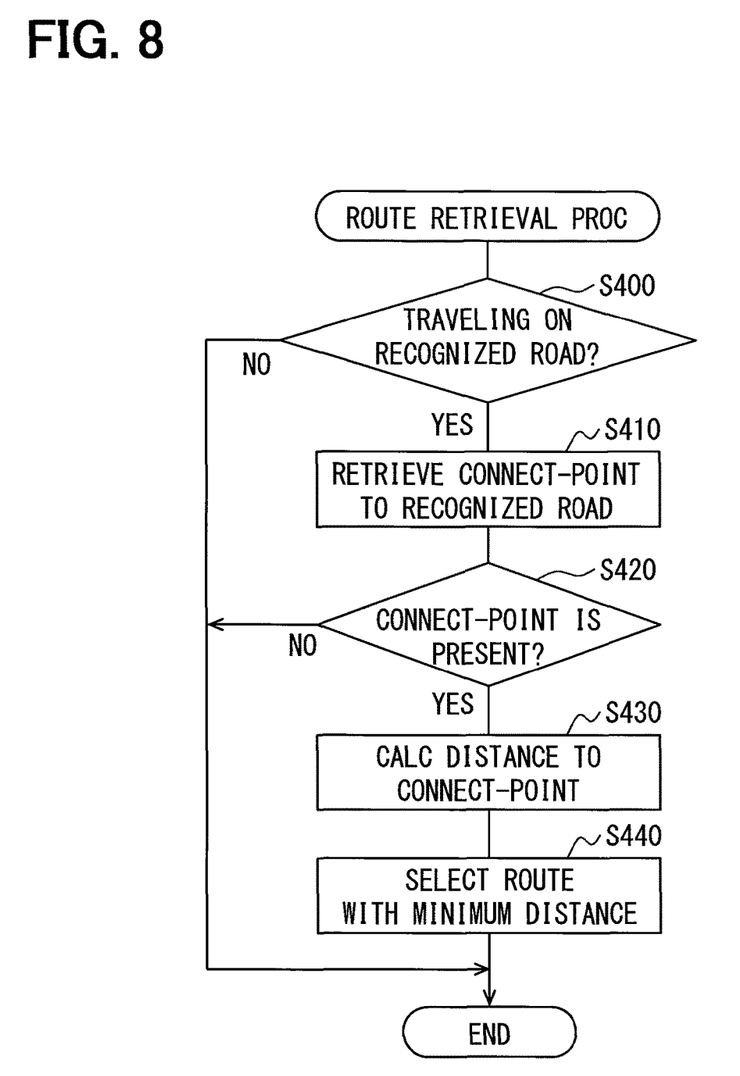
FIG. 8 is a flowchart illustrating a modification of route retrieval process of a first embodiment.

Thus, a route retrieval process as illustrated in FIG. 8 may be performed.

At S400, it is determined whether or not the vehicle is traveling on a recognized road. When it is determined that the vehicle is traveling on a recognized road (YES at S400), the processing proceeds to S410. When it is determined that the vehicle is not traveling on a recognized road (NO at S400), that is, when it is determined that the vehicle is traveling on an unrecognized road, the route retrieval process is ended.

At S410, a connection point from the destination to the recognized road is retrieved. In this step, a connection point to the recognized road on which the vehicle is traveling is retrieved around the destination. Specifically, the connection point within an Lm radius of the destination is retrieved.

A S420, it is determined whether or not the connection point is present. When it is determined that the connection point is present (YES at S420), the process proceeds to S430. When it is determined that the connection point is not present (NO at S420), the route retrieval process is ended without executing subsequent steps.

At S430, a distance to the connection point is calculated. This step calculates a road distance from the destination to the connection point. At S440, the route having minimum distance to the connection point is selected. It is noted that when only one connection point is retrieved, the route having this one connection point is selected.

When the determinations S400 and S420 are negative, the route retrieval process illustrated in FIG. 6 may be performed.

In an example of FIG. 7, because the vehicle J is traveling on the road I being the recognized road (YES at S400 in FIG. 8), a connection to the recognized road (in this case, the extension roads E1, E2 continuous with the traveled road I) is retrieved (S410). The explanation continues on assumption that the intersections S1, S2 are retrieved as the connection points. Next, it is determined that the connection point is present (YES at S420). A distance to the connection point is calculated (S430). Specifically, a distance from the destination G to the intersection S1 is calculated. Additionally, a distance from the destination G to the intersection S2 is calculated. Then, the route R1 having a smaller distance to the connection point is selected (S440).

Technical effects of the navigation device 1 of the present embodiment will be described.

In the present embodiment, based on information stored in an external memory 19, a retrieval section 10a (corresponding to an example of retrieval means) retrieves a route that contains an unrecognized road, which is a road other than recognized roads (S300 and S310 in FIGS. 6, S400 and S410 in FIG. 8). When multiple routes, each containing an unrecognized road, are retrieved by the retrieval section 10a (NO at S310, YES at S420), the selection section 10b (corresponding to an example of selection means) selects a route based on road conditions in respective routes (S340, S440).

Typically, when the unrecognized road in total roads of the route increases, the driver's workload increases. From this viewpoint, when multiple routes each containing an unrecognized road are retrieved by the retrieval section 10a, the selection section 10b selects a route based on road conditions in respective routes. Because of this, the driver's workload in traveling along the route can be minimized.

Specifically, after retrieving multiple routes having a route cost from the present position (departure point) to the destination less than or equal to the predetermined cost (S300 in FIG. 6), a determination section 10e (corresponding to an example of determination means) determines whether or not a route without having an unrecognized road is present among the multiple routes (S310), in order to search for multiple routes without having an unrecognized road. In other words, the retrieval section 10a retrieves multiple routes and thereafter determines whether or not a route without having an unrecognized road is present. This facilitates retrieval of a route having an unrecognized road.

Moreover, when the vehicle is traveling the recognized road (YES at S400 in FIG. 8), a connection point to this recognized road is retrieved (S410), and multiple routes having the unrecognized road are retrieved. Specifically, the retrieval section 10a searches for a route with an unrecognized road by retrieving the connection point from the destination to the recognized road that the vehicle is traveling. This facilitates retrieval of a route having an unrecognized road.

Moreover, in the present embodiment, distances of unrecognized roads are calculated (S330 in FIG. 6, S430 in FIG. 8), and a route having minimum distance of the unrecognized road is selected (S340, S440). Specifically, the selection section 10b selects a route that has a smallest total unrecognized road distance among the routes. This reduces a travel distance of the unrecognized road. The driver's workload in traveling to the destination along the route can be minimized.

Moreover, in the present embodiment, a travel road defined as a road the vehicle has actually traveled is specified and stored as travel history information in the external memory 19 (FIG. 2). Specifically, there is further provided a learn section 10d (corresponding to an example of learn means) that stores a travel road, which refers to a road the vehicle has actually traveled, as the recognized road in the external memory 19. This increases a possibility that the recognized road is a road that a user has recognized.

Further, a road continuous with the traveled road is set as the extension road (see FIG. 4). Specifically, the learn section 10d stores the extension road, which is continuous with the traveled road, in the external memory 19 as the recognized road. This increases a probability that the user can recognize the recognized road.

Second Embodiment

The present embodiment differs in route-retrieval process from the above-mentioned embodiment. Then, the route-retrieval process will be explained.

Figure 9A:
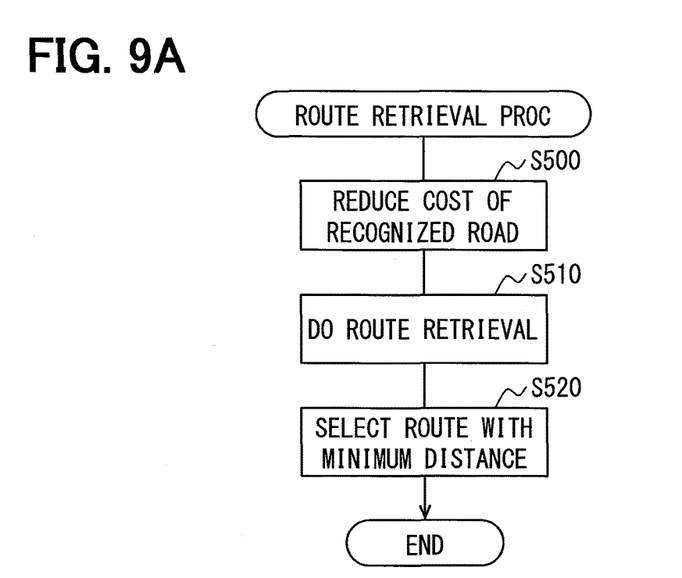
FIG. 9A is a flowchart illustrating a route retrieval process of a second embodiment.

As shown in FIG. 9A, at S500, the cost of the recognized road is decreased. The cost is set to a distance, speed limit, the number of lanes, the number of branches at an intersection etc., for links constituting the route. Therefore, by decreasing the cost of the recognized road, it becomes possible to preferentially select a route containing the recognized road. At S510, the route retrieval process is performed. At S520, a route with a smallest cost is selected.

Figure 9B:
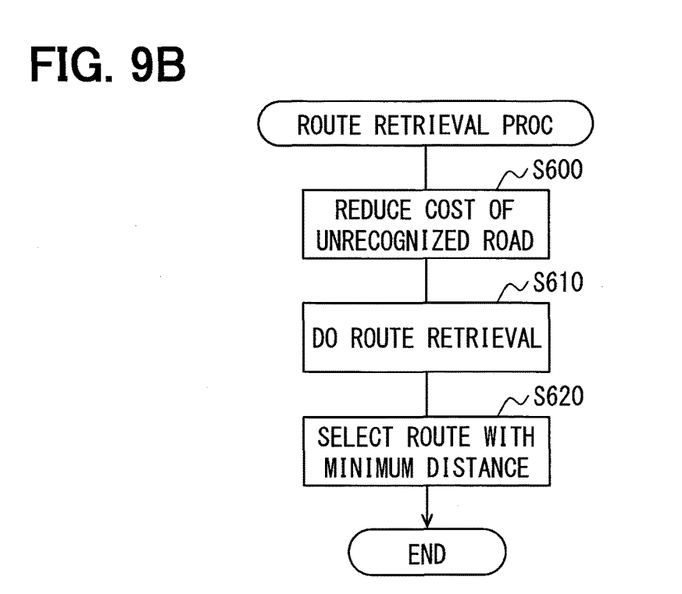
FIG. 9B is a flowchart illustrating a modification of route retrieval process of a second embodiment.

A modification of this route retrieval process is illustrated in FIG. 9B

In FIG. 9B, at S600, the cost of the unrecognized road is increased. By increasing the cost of the unrecognized road, it becomes possible to preferentially select a route that does not contain the unrecognized road. At S610, the route retrieval process is performed like S510. At S620, a route with a smallest cost is selected like S520.

The present embodiment can provide the same technical effects as the above-mentioned embodiment.

The present embodiment utilizes in particular, searching for a route with minimum cost by calculating the cost on a route-by-route basis. Thereby, after the cost of the recognized road or the unrecognized road is adjusted (S500 in FIG. 9A, S600 in FIG. 9B), the route retrieval process is performed (S510, S610) and the route with the smallest cost is selected (S520, S620). Specifically, the present embodiment further includes an adjustment section 10c (corresponding to an example of adjustment means) that adjusts at least one of the recognized road and the unrecognized road. Based on the costs of roads constituting respective routes, the selection section 10b selects a route with the smallest cost. Thus, the route selection process does not become complicated.

Specifically, the adjustment section 10c decreases the cost of the recognized road to below the cost of the unrecognized road (S500 in FIG. 9A). Alternatively, the cost of the unrecognized road is increased to above the cost of the recognized road (S600 in FIG. 9B). Thus, a process prior to the retrieval process does not become complicated. Alternatively, both the costs of the recognized road and the unrecognized road may be adjusted.

Embodiments of the present disclosure are not limited to the above-illustrated embodiments and may be provided in various forms.

(1) In the first embodiment, the road distance is calculated as the distance of the unrecognized road (S330 in FIG. 6, S430 in FIG. 8). That is, a spatial distance is calculated.

Alternatively, a temporal distance, which may be the road distance divided by a speed limit of the unrecognized road, may be calculated. This can provide the same technical effects as those described above.

(2) In the first embodiment, the distance of the unrecognized road is calculated and the route having the smallest distance is selected.

Alternatively, a route that has the smallest total number of road types of the unrecognized roads may be selected. The road type may be determined based on a road name, a road scale (the total number of lane, a road width), free or toll, and an automobile-dedicated road or not. Alternatively, a route that has the smallest task processes may be selected. The task process may be a right turn, a left turn and the like, which increase the driver's workload. Specifically, the selection section 10b may select a route based on connection conditions of unrecognized roads of respective routes. This can also provide the same technical effects as the above embodiments.

(3) In the second embodiment, it is determined whether or not the vehicle is traveling the recognized road (S400 in FIG. 8). When it is determined that the vehicle is traveling the recognized road (YES at S400), the connection point from the destination to the recognized road is retrieved (S410).

Alternatively, when the vehicle is traveling the unrecognized road and the recognized road is present around the destination, a connection point from the present position (departure point) to the recognized road may be retrieved. Specifically, the retrieval section 10a may retrieve a connection from the present position (departure point) to the recognized road to retrieve a route containing the unrecognized road. This also facilitates retrieving a route that has the unrecognized road.

(4) In the above embodiments, the traveled road and the extension road are treated equally as the recognized road. However, the traveled road and the extension road may be distinguished in considering the cost of the recognized road, the distance of the recognized road, the connection condition of the recognized road etc. For example, when the cost is decreased, the cost of the travel road is decreased to below the cost of the extension road. This further enhances the technical effects of the above embodiments. It is noted that in the present disclosure, the extension road is defined as a road that is continuous with the travel road, which the vehicle has actually traveled. For example, the extension road may be a road that is connected to the traveled road and that extends in the same direction as the traveled road. Further, the extension road may include a road that is not directly connected to the traveled road and that extends in the same direction as the traveled road.

Further, the extension road may include a road that has the same road name as the traveled road, or that has the same road type or width as the traveled road.

While embodiments and configurations according to the present disclosure have been illustrated, embodiments and configurations according to the present disclosure are not limited to the above-illustrated embodiments and configurations. Embodiments and configurations obtained by combining technical parts disclosed in different embodiments and configurations are also included in embodiments and configurations according to the present disclosure.

The invention claimed is:

1. A navigation device for performing route guidance along a route, comprising:
   a controller, the controller is configured to retrieve, by a retrieval section, a route to a set destination; and
   a storage device that stores a traveled road as a recognized road and stores an extension road as a recognized road, wherein the traveled road is a road that has been actually traveled by a vehicle equipped with the navigation device, wherein the extension road is not the traveled road actually traveled by the vehicle but is a road continuous with the traveled road, wherein the recognized road is a road recognized by a user with a high possibility, the route can include a turn at an intersection, and the intersection can connect to a plurality of roads,
   wherein:
   the controller is further configured to
      when the traveled road traveled by the vehicle equipped with the navigation device includes a turn at an intersection,
         store, in the storage device, the traveled road that passes through the intersection and includes the turn at the intersection;
         determine whether or not a road, that is not the traveled road but which connects to the traveled road at the intersection, (i) extends from the intersection in substantially a same direction as a direction of travel on the traveled road and (ii) is continuous with the traveled road at the intersection;
store, in the storage device, as the extension road, the road determined to extend in substantially the same direction from and be continuous with the traveled road at the intersection;
not store, in the storage device, as the extension road, the road determined to not extend in substantially the same direction from or not be continuous with the traveled road at the intersection;
include a selection section in the retrieval section; and
when a plurality of routes each to the set destination are retrieved, select, by the selection section, a route from among the plurality of routes based on a distance of an unrecognized road, a travel time taken to travel the unrecognized road, or a connection condition of the unrecognized road, wherein the unrecognized road is a road other than the recognized road stored in the storage device.

2. The navigation device according to claim 1, further comprising:
a determination section that, after the plurality of routes are retrieved, determines whether or not a route without having the unrecognized road is present among the plurality of routes, wherein:
when the determination section determines that the route without having the unrecognized road is present, the selection section selects the route that is determined as not having the unrecognized road.

3. The navigation device according to claim 1, wherein:
the retrieval section retrieves a connection point from the destination point to the recognized road on which the vehicle is traveling, or retrieves a connection from the departure point to the recognized road around the destination; and the retrieval section retrieves a route based on the connection point.

4. The navigation device according to claim 1, wherein:
the selection section selects a route that has a smallest distance of the unrecognized road from among the plurality of routes or a smallest travel time of the unrecognized road from among the plurality of routes.

5. The navigation device according to claim 1, wherein:
based on connection conditions of the unrecognized roads of respective routes, the selection section selects a route that has a smallest variation in road type of the unrecognized roads from among the plurality of routes or a smallest number of turn at intersections from among the plurality of routes.

6. The navigation device according to claim 1, further comprising:
an adjustment section that adjusts cost of at least one of the recognized road and the unrecognized road, wherein:
the selection section selects a route having a minimum cost, based on the costs of roads of respective routes.

7. The navigation device according to claim 6, wherein:
the adjustment section decreases the cost of the recognized road to be smaller than the cost of the unrecognized road.

8. The navigation device according to claim 6, wherein:
the adjustment section increases the cost of the unrecognized road to be larger than the cost of the recognized road.

9. The navigation device according to claim 1, further comprising:
a learn section that stores a road that the vehicle has actually traveled as the recognized road in the storage device.

10. The navigation device according to claim 9, wherein:
the learn section stores a road that has continuity with the traveled road as the recognized road in the storage device.

11. A navigation device for performing route guidance along a route, comprising:
a controller, the controller is configured to retrieve, by a retrieval section, a route to a set destination; and
a storage device that stores a traveled road as a recognized road and stores an extension road as a recognized road, wherein the traveled road is a road that has been actually traveled by a vehicle equipped with the navigation device, wherein the extension road is not the traveled road actually traveled by the vehicle but is a road continuous with the traveled road, wherein the recognized road is a road recognized by a user with a high possibility, the route can include a turn at an intersection, and the intersection can connect to a plurality of roads;
the controller is further configured to
when the traveled road traveled by the vehicle equipped with the navigation device includes a turn at an intersection,
store, in the storage device, the traveled road that passes through the intersection and includes the turn at the intersection;
determine whether or not a road, that is not the traveled road but which connects to the traveled road at the intersection, (i) extends from the intersection in substantially the same direction as a direction of travel on the traveled road and (ii) is continuous with the traveled road at the intersection;
store, in the storage device, as the extension road, the road determined to extend in substantially the same direction from and be continuous with the traveled road at the intersection;
not store, in the storage device, as the extension road, the road determined to not extend in substantially the same direction from or not be continuous with the traveled road at the intersection;
retrieve, by the retrieval section, a connection point from the destination point to the recognized road on which the vehicle is traveling, or retrieve a connection point from the departure point to the recognized road around the destination; and then retrieve a route based on the connection point.

12. The navigation device according to claim 11, further comprising
a selection section that, from among a plurality of the routes, select a route that has a smallest distance of an unrecognized road from among the plurality of the routes or a smallest travel time of the unrecognized road from among the plurality of the routes, wherein the unrecognized road is a road other than the recognized road stored in the storage device.

13. The navigation device according to claim 11, wherein:
based on connection conditions of the unrecognized roads of respective routes, the selection section selects a route that has a smallest variation in road type of the unrecognized roads from among the plurality of the routes, or a route that has a smallest number of turns at intersections from among the plurality of the routes.

14. A non-transitory tangible storage medium storing a program implementing a function of each section of the navigation device recited in claim 1.

15. The navigation device storage device according to claim 1, wherein:
the storage device stores travel history information classifying a link into three categories, which are the traveled road, the extension road, and the unrecognized road being neither the traveled road nor the extension road.

16. The navigation device according to claim 11, wherein the storage device store travel history information classifying a link into three categories, which are the traveled road, the extension road, and the unrecognized road being neither the traveled road nor the extension road.

17. The navigation device according to claim 1, wherein a road that is connected to the traveled road and that has a same road name as the traveled road is stored as the extension road in the storage device, wherein the same road name means that a road name acquired from a link for the road which is connected to the traveled road matches a road name acquired from a link for the traveled road.

18. The navigation device according to claim 11, wherein a road that is connected to the traveled road and that has a same road name as the traveled road is stored as the extension road in the storage device, wherein the same road name means that a road name acquired from a link for the road which is connected to the traveled road matches a road name acquired from a link for the traveled road.

19. The navigation device according to claim 1, wherein when the plurality of routes each to the set destination are retrieved, the selection section selects a route that has a smallest distance of the unrecognized road from among the plurality of routes.

20. The navigation device according to claim 11, wherein when a plurality of routes each to the set destination are retrieved, the retrieval section selects a route that has a smallest distance of the unrecognized road from among the plurality of routes.

\* \* \* \* \*